(12) United States Patent
Yu et al.

(10) Patent No.: US 11,531,426 B1
(45) Date of Patent: Dec. 20, 2022

(54) EDGE ANTI-FALSE-TOUCH METHOD AND APPARATUS, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventors: Xing Yu, Beijing (CN); Yongkang Fan, Beijing (CN); Suyue Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/702,712

(22) Filed: Mar. 23, 2022

(30) Foreign Application Priority Data

Oct. 29, 2021 (CN) .......................... 202111275601.X

(51) Int. Cl.
*G06F 3/041* (2006.01)
*G06F 3/01* (2006.01)
*G06T 7/70* (2017.01)
*G06F 3/0346* (2013.01)
*G06V 40/16* (2022.01)

(52) U.S. Cl.
CPC ............ *G06F 3/0418* (2013.01); *G06F 3/012* (2013.01); *G06F 3/017* (2013.01); *G06F 3/0346* (2013.01); *G06T 7/70* (2017.01); *G06V 40/161* (2022.01); *G06T 2207/30201* (2013.01)

(58) Field of Classification Search
CPC ........ G06F 3/012; G06F 3/017; G06F 3/0346; G06F 3/0418; G06T 7/70; G06T 2207/30201; G06V 40/161
See application file for complete search history.

(56) References Cited

U.S. PATENT DOCUMENTS

| 10,620,825 | B2 * | 4/2020 | Liu | G06F 1/1686 |
| 10,691,298 | B2 * | 6/2020 | Zhang | G06F 3/04883 |
| 10,860,191 | B2 * | 12/2020 | Han | G06F 3/0481 |
| 11,188,197 | B2 * | 11/2021 | Zhang | G06F 3/04883 |
| 11,226,736 | B2 * | 1/2022 | Liu | G06F 1/1643 |
| 2015/0185979 | A1 * | 7/2015 | Zhang | G06F 3/0482 |
| | | | | 715/833 |

(Continued)

FOREIGN PATENT DOCUMENTS

| CN | 110456938 A | 11/2019 |
| CN | 113110762 A * | 7/2021 |

(Continued)

OTHER PUBLICATIONS

Extended European Search Report of EP Application No. 22165117.7 dated Sep. 23, 2022, (8p).

*Primary Examiner* — Michael Pervan
(74) *Attorney, Agent, or Firm* — Arch & Lake LLP

(57) ABSTRACT

An edge anti-false-touch method is provided. The method includes: obtaining, by a mobile terminal, a face direction of a user of a mobile terminal, and obtaining gesture data of the mobile terminal; determining, by the mobile terminal according to the face direction and the gesture data, a screen display state of the mobile terminal; and adjusting, by the mobile terminal based on the screen display state, a size of an anti-false-touch region of the mobile terminal to trigger an anti-false-touch response of the anti-false-touch region.

20 Claims, 10 Drawing Sheets

Obtain a face direction of a user of a mobile terminal, and obtain gesture data of the mobile terminal — 21

↓

Determine, according to the face direction and the gesture data, a screen display state of the mobile terminal — 22

↓

Adjust, based on the screen display state, a size of an anti-false-touch region of the mobile terminal so as to trigger an anti-false-touch response of the anti-false-touch region — 23

(56) References Cited

U.S. PATENT DOCUMENTS

| | | | | |
|---|---|---|---|---|
| 2016/0378334 A1* | 12/2016 | Liu | ................... | G06F 3/04886 |
| | | | | 715/794 |
| 2020/0034026 A1* | 1/2020 | Han | ..................... | G06F 3/0488 |
| 2020/0192569 A1* | 6/2020 | Liu | ...................... | G06F 1/1688 |
| 2020/0233546 A1* | 7/2020 | Zhang | ................. | G06F 3/04883 |
| 2022/0050561 A1* | 2/2022 | Zhang | ................. | G06F 3/04883 |
| 2022/0121316 A1 | 4/2022 | Chen et al. | | |

FOREIGN PATENT DOCUMENTS

| | | | | | |
|---|---|---|---|---|---|
| EP | 3961358 | A1 | 3/2022 | | |
| EP | 4050465 | A1 | 8/2022 | | |
| JP | 2018032425 | A * | 3/2018 | .......... | G06F 3/0482 |
| WO | WO-2017143848 | A1 * | 8/2017 | .......... | G06F 3/0346 |
| WO | 2020259674 | A1 | 12/2020 | | |
| WO | 2021115210 | A1 | 6/2021 | | |

* cited by examiner

EDGE ANTI-FALSE-TOUCH METHOD AND APPARATUS, ELECTRONIC DEVICE AND COMPUTER-READABLE STORAGE MEDIUM

CROSS REFERENCE TO RELATED APPLICATION

The present application is based upon and claims the priority to Chinese Application No. 202111275601.X, filed on Oct. 29, 2021, the content of which is incorporated herein by reference in its entirety for all purposes.

BACKGROUND

With the development of terminal technologies, a touch operation manner for edges of a mobile terminal appears. For example, an edge touch function is provided on a mobile phone, so that an operable region of the mobile phone extends from a screen to both sides of a border of the mobile phone. A user can start a shutter by touching the side border of the mobile phone when taking a photo, and can quickly return by touching the borders of the phone twice in succession when browsing a webpage.

SUMMARY

The disclosure relates to the technical field of terminals, in particular to an edge anti-false-touch method, an electronic device, and a non-transitory computer-readable storage medium.

According to a first aspect of an example of the disclosure, an edge anti-false-touch method is provided. The method includes: obtaining, by a mobile terminal, a face direction of a user of the mobile terminal, and obtaining gesture data of the mobile terminal, where the face direction includes a first included angle between a human face direction in a current image and a first coordinate axis in a coordinate system where the mobile terminal is located; determining, by the mobile terminal according to the face direction and the gesture data, a screen display state of the mobile terminal; and adjusting, by the mobile terminal based on the screen display state, a size of an anti-false-touch region of the mobile terminal to trigger an anti-false-touch response of the anti-false-touch region.

According to a second aspect of an example of the disclosure, an electronic device is provided, and includes: a processor; and a memory configured to store processor-executable programs. The processor is configured to implement any method as described above.

According to a third aspect of an example of the disclosure, a non-transitory computer-readable storage medium on which a computer-executable program is stored is provided. When the computer-executable program is executed by a processor, the steps of any method as described above are implemented.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

Figure 1:
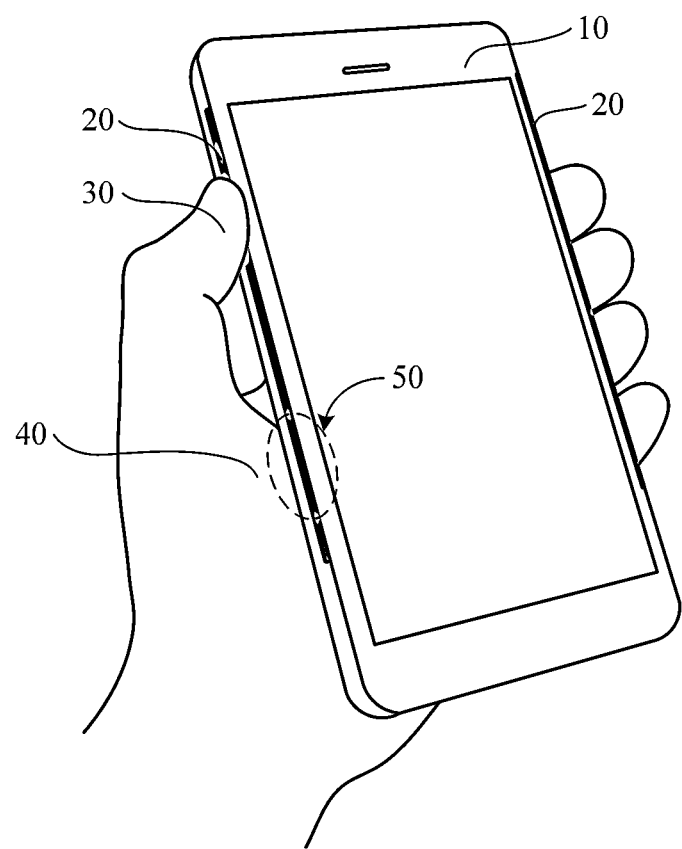
FIG. 1 is a schematic diagram of edge touch according to some related examples.

Some examples will be described in detail herein, instances of which are illustrated in accompanying drawings. When the following description refers to the accompanying drawings, the same numbers in different accompanying drawings represent the same or similar elements unless otherwise indicated. Implementations described in the following examples do not represent all implementations consistent with the disclosure. On the contrary, they are merely instances of an apparatus and a method consistent with some aspects of the disclosure as detailed in appended claims.

Terms used in the disclosure are for the purpose of describing particular examples only and are not intended to limit the disclosure. As used in the disclosure and the appended claims, singular forms "a", "the" and "this" are intended to include plural forms as well, unless the context clearly dictates otherwise. It should also be understood that the term "and/or" as used herein refers to and includes any or all possible combinations of one or more of associated listed items.

It should be understood that although the terms first, second, third, etc. may be used in the disclosure to describe various information, such information should not be limited by these terms. These terms are only used to distinguish the same type of information from each other. For example, first information may also be referred to as second information, and similarly, the second information may also be referred to as the first information, without departing from the scope of the disclosure. Depending on the context, the word "if" as used herein may be interpreted as "at the time of" or "when" or "in response to determining".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic diagram of edge touch according to some related examples. As shown in FIG. 1, edge sensing regions (gray parts in FIG. 1) 20 are located on edges of both sides of a mobile phone 10. A user can trigger the mobile phone 10 to perform corresponding operations by touching the edge sensing regions 20. For example, the user can start a shutter by touching the edge sensing regions 20 when using the mobile phone 10 to take a photo, and can quickly return to a previous page by touching the edge sensing regions 20 when using the mobile phone 10 to browse web pages.

In order to avoid misoperations, in the related art, an anti-false-touch region may be set at an edge where a grip is located to improve the experience of the mobile phone 10. In the related art, a sensor (such as a gravity sensor, a three-axis gyroscope, and an acceleration sensor) is disposed in the mobile phone 10, and gesture data (also referred to as orientation data) of the mobile phone 10 are collected through the sensor to determine whether the mobile phone 10 is displayed in a portrait mode or a landscape mode.

However, when the mobile phone 10 is used in some scenarios (for example, the user is in a side-lying state or a sports state), only using the sensor to determine whether the mobile phone 10 is displayed in the portrait mode or the landscape mode may result in misjudgment. For example, when the user is in the side-lying state and uses the mobile phone 10 in the portrait orientation, the sensor determines that a Y-axis of a coordinate system where the mobile phone 10 is located is parallel to the horizontal plane, and determines that the mobile phone 10 is displayed in the landscape orientation, resulting in false operations on the edge sensing regions 20, which may cause inconvenience to the user and affect user experience.

In order to solve the above technical problems, the disclosure provides an edge anti-false-touch method. The inventive concept is that a face image of the user is collected through a camera in a mobile terminal, an included angle between a human face direction in the face image and a first coordinate axis in a coordinate system where the mobile terminal is located is determined, and the relative positional relationship between the human face and the mobile terminal may be determined, for example, the human face direction is parallel to the first coordinate axis or the human face direction is perpendicular to the first coordinate axis. An orientation of the mobile terminal is determined in combination with data collected by a sensor in the mobile terminal, and finally a screen display state of the mobile terminal may be determined, so the problem of misjudgment caused by only using the sensor may be avoided. A detailed description is given below with reference to the examples.

Figure 2:
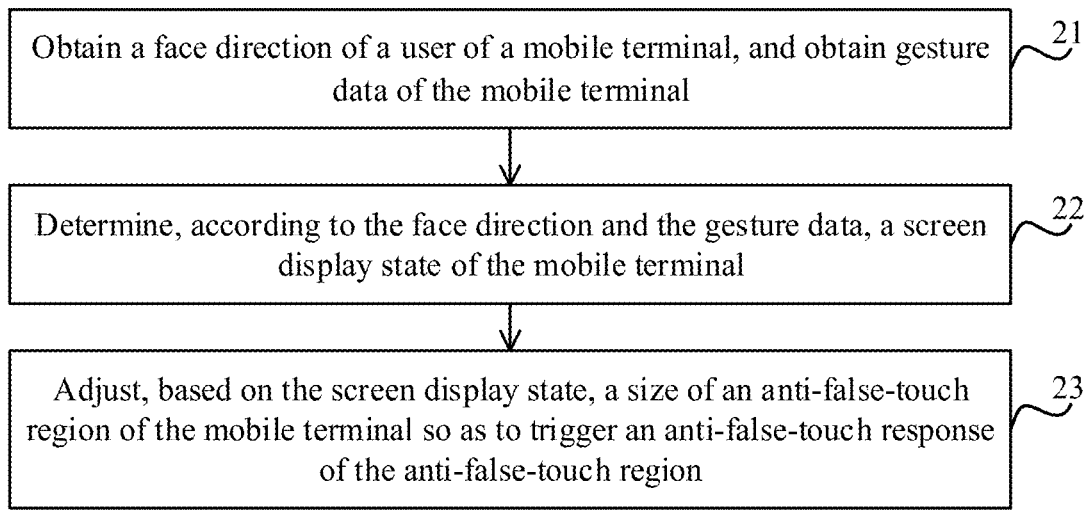
FIG. 2 is a flow chart of an edge anti-false-touch method according to an example.

FIG. 2 is a flow chart of an edge anti-false-touch method according to an example. Referring to FIG. 2, the method may be applied to the mobile terminal, and includes steps 21 to 23.

In step 21, a face direction of a user of the mobile terminal is obtained, and gesture data of the mobile terminal are obtained. The face direction includes a first included angle between a human face direction in a current image and a first coordinate axis in a coordinate system where the mobile terminal is located.

Figure 3:
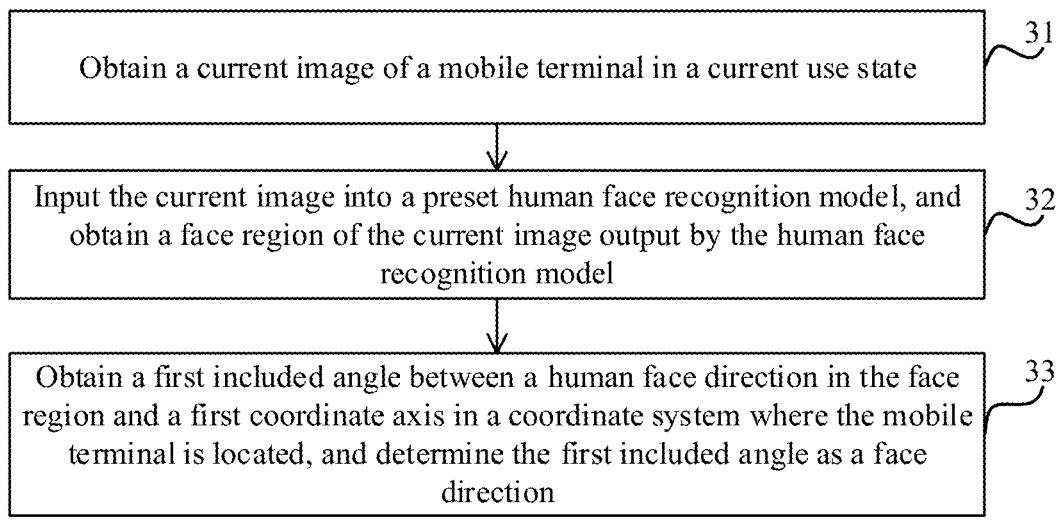
FIG. 3 is a flow chart of obtaining a face direction according to an example.

In the example, a (front-facing) camera is disposed in the mobile terminal, such as a low-power camera, so that power consumption may be reduced while images are collected. The mobile terminal may control the camera to collect the images to obtain the face direction of the user. Referring to FIG. 3, steps 31 to 33 are included.

In step 31, the mobile terminal may obtain the current image of the mobile terminal in a current use state. For example, in response to determining the mobile terminal is in a use state, the mobile terminal may control the camera to collect the current image in the current use state according to a preset period. It can be understood that since the user is using the mobile terminal, the head of the user may enter the viewing range of the camera, so that the current image includes a face region of the user.

In step 32, the mobile terminal may input the current image to a preset human face recognition model, and obtain the face region of the current image output by the human face recognition model. The human face recognition model may include but is not limited to: convolutional neural networks, recurrent neural networks, deep belief networks, generative adversarial networks, etc., which may be set according to specific scenarios. Corresponding solutions fall within the protection scope of the disclosure in the case where the face region may be determined. It can be understood that the human face direction may be determined from the face region in the current image, namely, a direction parallel to a connecting line between the top and bottom of a face, or a direction of the height of the user. In addition, in the example, the posture of the user may be represented through the human face direction in the above face region.

Figure 4:
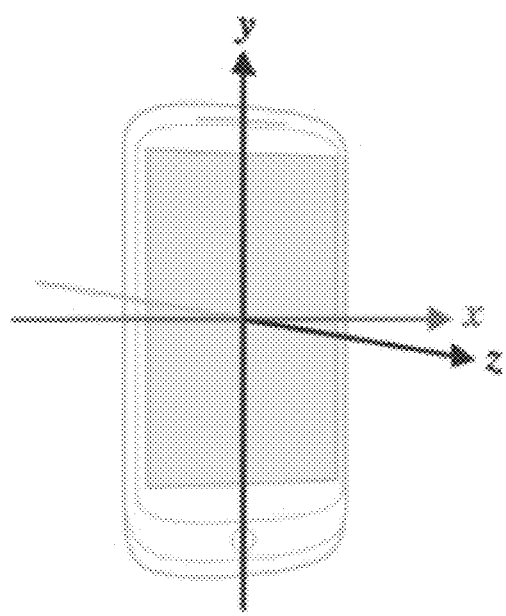
FIG. 4 is a schematic diagram of a coordinate system where a mobile terminal is located according to an example.

In step 33, the mobile terminal may obtain the first included angle between the human face direction in the face region and the first coordinate axis in the coordinate system where the mobile terminal is located, and determine the first included angle as the face direction. The coordinate system where the mobile terminal is located is as shown in FIG. 4. The coordinate system is established with a center point of the mobile terminal as a coordinate origin, a width direction as an X-axis, a height direction as a Y-axis, and a direction perpendicular to a display screen as a Z-axis. The first coordinate axis may be the X-axis or the Y-axis in the coordinate system. A second coordinate axis described below may be the X-axis or the Y-axis in the coordinate system, and is perpendicular to the first coordinate axis. For convenience of description, in the disclosure, the first coordinate axis is implemented by the Y-axis, and the second coordinate axis is implemented by the X-axis.

In step 33, in response to determining the human face direction and the first coordinate axis are known, an included angle between the human face direction and the first coordinate axis, namely, the first included angle may be figured out. It can be understood that the process of obtaining the first included angle may be converted into obtaining an included angle of two straight lines in a plane in mathematics. The calculation process may refer to the related art, which will not be repeated here.

In the example, a sensor, such as a gravity sensor, a three-axis gyroscope and an acceleration sensor, may be disposed in the mobile terminal. The above sensor may control to collect the gesture data of the mobile terminal in a set period.

In step 22, the screen display state of the mobile terminal is determined according to the face direction and the gesture data.

Figure 5:
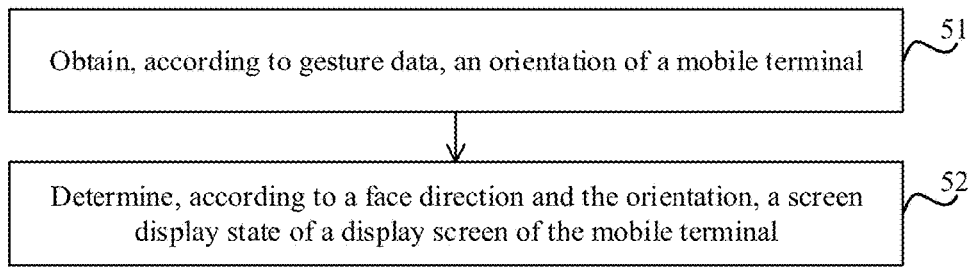
FIG. 5 is a schematic diagram of obtaining a screen display state according to an example.

In the example, the mobile terminal may determine the screen display state of the mobile terminal according to the face direction and the gesture data. Referring to FIG. 5, steps 51 to 52 are included.

In step 51, the mobile terminal may obtain the orientation of the mobile terminal according to the gesture data. For example, the mobile terminal may obtain a second included angle between a second coordinate axis in the coordinate system where the mobile terminal is located and the horizontal plane according to the gesture data, and determine the second included angle as the orientation of the mobile terminal. The second coordinate axis is perpendicular to the first coordinate axis. In response to determining the gesture data are collected by the three-axis gyroscope, an offset of the Y-axis may be directly read, and a projection angle of the offset on an XY plane may be used as the above second included angle. It can be understood that the process of obtaining the second included angle may be converted into obtaining an included angle of two straight lines in space in mathematics. The calculation process may refer to the related art, which will not be repeated here.

In step 52, the mobile terminal may determine the screen display state of the display screen of the mobile terminal based on the face direction and the orientation. For example, the mobile terminal may compare the face direction with a preset first face direction range and a preset second face direction range, and compare the orientation with a preset first orientation range and a preset second orientation range. The first face direction range may be −20-20 degrees, the second face direction range may be 70-110 degrees, the first orientation range may be 70-110 degrees, and the second orientation range may be −20-20 degrees. In response to determining the face direction is within the first face direction range and the orientation is within the first orientation range, the mobile terminal may determine that the screen display state of the mobile terminal is a portrait state. In response to determining the face direction is within the second face direction range and the orientation is within the second orientation range, the mobile terminal may determine that the screen display state of the mobile terminal is a landscape state.

Figure 6:
FIG. 6 is a schematic diagram illustrating a scenario where a user is in a side-lying state and a mobile terminal is in a portrait state according to an example.

It should be noted that when the face direction is within the first face direction range, it indicates that the face direction is parallel to the Y-axis of the mobile terminal, and the mobile terminal may be in the portrait state at this time. When the orientation is within the first orientation range, it indicates that the X-axis of the mobile terminal is perpendicular to the horizontal plane, and the mobile terminal is in the landscape state (that is, the width direction is perpendicular to the horizontal plane) at this time. When the above two conditions are met at the same time, it indicates that the user is lying on the side and the screen display state is the portrait state, and the effect is as shown in FIG. 6.

When the face direction is within the second face direction range, it indicates that the face direction is perpendicular to the Y axis of the mobile terminal, and the mobile terminal may be in the landscape state at this time. When the orientation is within the second orientation range, it indicates that the X-axis of the mobile terminal is parallel to the horizontal plane, and the mobile terminal is in the portrait state (that is, the height direction is perpendicular to the horizontal plane) at this time. When the above two conditions are met at the same time, it indicates that the user is lying on the side and the screen display state is the landscape state, and at this time, the direction of the mobile terminal may be obtained by rotating by 90 degrees from the position shown in FIG. 6.

It should also be noted that, "perpendicular" in the content of step 52 does not strictly mean that the angle between the two must be 90 degrees, and when the angle is within the range of 70-110 degrees, it may be understood as perpendicular. Similarly, "parallel" does not strictly mean that the angle between the two must be 0 degree, and when the angle is within the range of −20-20 degrees, it may be understood as parallel. The above angle range may be set according to the specific scene, for example, −30-30 degrees, and 60-120 degrees. The solution of the disclosure may be implemented in the case where it may be roughly judged that the two are parallel or tend to be parallel, vertical or tend to be vertical. The above solution also falls within the protection scope of the disclosure.

Figure 7:
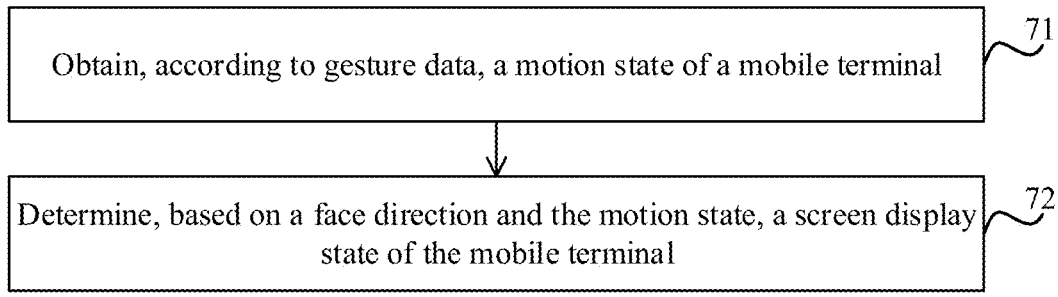
FIG. 7 is another schematic diagram of obtaining a screen display state according to an example.

The above examples shown in FIGS. 3 to 6 are suitable for a scenario where the mobile terminal is used in a side-lying scenario. In a sports scenario, the mobile terminal obtains the screen display state. Referring to FIG. 7, steps 71 to 72 are included.

In step 71, the mobile terminal may obtain a motion state of the mobile terminal according to the gesture data. The mobile terminal includes one or more sensors such as a gravity sensor, an acceleration sensor or a GPS device, and the gesture data are collected by using the above sensors. Taking the acceleration sensor as an example, the mobile terminal may obtain acceleration data output by the acceleration sensor, and may determine that the user is in a walking, jogging, race walking, or other motion state according to a direction (such as up, down, up, down, etc., and having a forward component) of the acceleration data. For convenience of description, in this step, the motion state such as walking, jogging, and race walking that is suitable for viewing the mobile terminal are referred to as a target state. It should be noted that determining the motion state of the mobile terminal according to the gesture data collected by the sensor may also be implemented by other solutions in the related art, and the corresponding solutions also fall within the protection scope of the disclosure.

In step 72, the mobile terminal may determine the screen display state of the mobile terminal based on the face direction and the motion state. For example, the mobile terminal may compare the face direction with the preset first face direction range and the second face direction range, and determine whether the motion state is the target state. In response to determining the face direction is within the first face direction range and the motion state is the target state, it is determined that the screen display state of the mobile terminal is the portrait state. In response to determining the face direction is within the second face direction range and the motion state is the target state, it is determined that the screen display state of the mobile terminal is the landscape state.

Figure 8:
FIG. 8 is a schematic diagram illustrating a scenario where a user is in a target state and a mobile terminal is in a portrait state according to an example.

It should be noted that, in step 72, in response to determining the face direction is within the first face direction range, it indicates that the face direction is parallel to the Y axis of the mobile terminal, and the mobile terminal may be in the portrait state at this time. The motion state of the mobile terminal is the target state, and an implicit condition is that the user is in a standing state or the height direction is perpendicular to the horizontal plane. In response to determining the above two conditions are met at the same time, it indicates that the user is in the sports scenario and the screen display state is the portrait state, and the effect is as shown in FIG. 8.

In response to determining the face direction is within the second face direction range, it indicates that the face direction is perpendicular to the Y-axis of the mobile terminal, and the mobile terminal may be in the landscape state at this time. The motion state of the mobile terminal is the target state, and the implicit condition is that the user is in the standing state or the height direction is perpendicular to the horizontal plane. In response to determining the above two conditions are met at the same time, it indicates that the user is in the sports scenario and the screen display state is the landscape state. At this time, the direction of the mobile terminal is obtained by rotating by 90 degrees from the position shown in FIG. 8.

It should also be noted that "perpendicular" and "parallel" in the content of step 72 have the same meanings as in step 52. For details, see step 52, which will not be repeated here.

In step 23, a size of an anti-false-touch region of the mobile terminal is adjusted based on the screen display state to trigger an anti-false-touch response of the anti-false-touch region.

Figure 9:
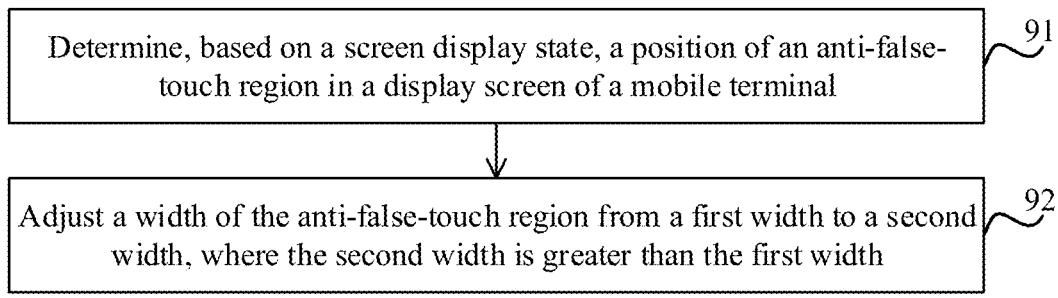
FIG. 9 is a flow chart of adjusting a width of an anti-false-touch region according to an example.

In an example, referring to FIG. 9, in step 91, the mobile terminal may determine the position of the anti-false-touch region in the display screen of the mobile terminal based on the screen display state. It can be understood that, in response to determining the screen display state is known, the position of the anti-false-touch region in the display screen may be directly obtained. For example, in response to determining the screen display state is the portrait state, the position of the anti-false-touch region is located at edges of left and right sides (that is, both sides in the width direction) of the display screen of the mobile terminal. In response to determining the screen display state is the landscape state, the position of the anti-false-touch region is located at the edges of the top and bottom (that is, both sides in the height direction) of the display screen of the mobile terminal. In step 92, the mobile terminal may adjust a width of the anti-false-touch region from a first width to a second width, where the second width is greater than the first width. In other words, since the user is in the side-lying state or in the sports state, the contact area between a palm and the mobile terminal is increased because the user may grip the mobile terminal vigorously. In this step, the width of the anti-false-touch region is increased to avoid the misoperations.

Figure 10:
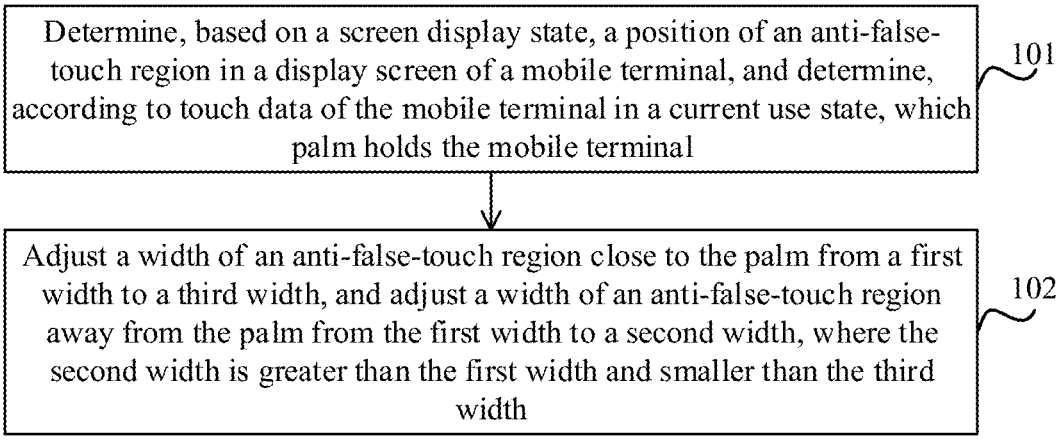
FIG. 10 is another flow chart of adjusting a width of an anti-false-touch region according to an example.

In another example, referring to FIG. 10, in step 101, the mobile terminal may determine the position of the anti-false-touch region in the display screen of the mobile terminal based on the screen display state, which may refer to the content of step 91, and may not be repeated here. In step 101, the mobile terminal may determine which palm holds the mobile terminal according to touch data of the mobile terminal in the current use state. The palm includes a left palm or a right palm, that is, whether the mobile terminal is held with the left palm or the right palm is determined. For example, the mobile terminal may obtain the touch data in the current use state. Since a contact region between a thumb and the display screen is a region with a large area, and contact regions between the remaining four fingers and the display screen are a plurality of adjacent regions with small areas. The mobile terminal may obtain an area of a touch region. A region with an area that exceeds a first area threshold is used as the contact region of the thumb, and regions with areas smaller than a second area threshold are used as the contact regions of the other four fingers. Whether it is the left palm or the right palm is determined according to the relative position relationship between the thumb and the other four fingers. Technicians may also select a solution for determining the palm according to a specific scenario, such as a neural network. In the case where the left palm or the right palm may be determined, a corresponding solution falls within the protection scope of the disclosure.

In step 102, the mobile terminal may adjust a width of an anti-false-touch region close to the palm from the first width to a third width, and adjust a width of an anti-false-touch region away from the palm from the first width to the second width. The second width is greater than the first width and smaller than the third width. In this way, in this step, by increasing the width of the anti-false-touch region corresponding to the other four fingers and further increasing the width of the anti-false-touch region corresponding to the thumb, the misoperations may be avoided.

It should be noted that, after determining the anti-false-touch region, the mobile terminal may realize the anti-false-touch response, for example, the touch operation in the anti-false-touch region is an effective touch operation after exceeding a set duration, or after a touch area of the anti-false-touch region exceeds a set area threshold, etc. The technician may select an appropriate solution for anti-false-touch response according to the specific scenario, and the corresponding solution falls within the protection scope of the disclosure.

Figure 11:
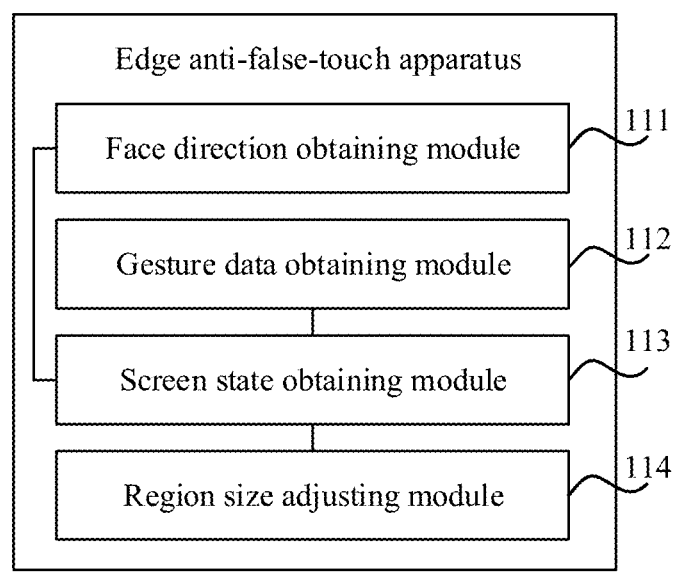
FIG. 11 is a block diagram of an edge anti-false-touch apparatus according to an example.

On the basis of the above edge anti-false-touch method, an example of the disclosure further provides an edge anti-false-touch apparatus. Referring to FIG. 11, the apparatus is applied to a mobile terminal, and includes:

a face direction obtaining module 111, configured to obtain a face direction of a user of the mobile terminal, where the face direction includes a first included angle between a human face direction in a current image and a first coordinate axis in a coordinate system where the mobile terminal is located;

a gesture data obtaining module 112, configured to obtain gesture data of the mobile terminal;

a screen state obtaining module 113, configured to determine, according to the face direction and the gesture data, a screen display state of the mobile terminal; and a region size adjusting module 114, configured to adjust, based on the screen display state, a size of an anti-false-touch region of the mobile terminal to trigger an anti-false-touch response of the anti-false-touch region.

In an example, the face direction obtaining module includes:

a current image obtaining sub-module, configured to obtain the current image of the mobile terminal in a current use state;

a region obtaining sub-module, configured to input the current image into a preset human face recognition model, and obtain a face region of the current image output by the human face recognition model; and a first included angle obtaining sub-module, configured to obtain the first included angle between the human face direction in the face region and the first coordinate axis in the coordinate system where the mobile terminal is located, and determine the first included angle as the face direction.

In an example, the screen state obtaining module includes:

a terminal orientation obtaining sub-module, configured to obtain, according to the gesture data, an orientation of the mobile terminal; and a screen state obtaining sub-module, configured to determine, based on the face direction and the orientation, the screen display state of a display screen of the mobile terminal.

In an example, the terminal orientation obtaining sub-module includes:

a second included angle obtaining sub-module, configured to obtain, according to the gesture data, a second included angle between a second coordinate axis in the coordinate system where the mobile terminal is located and the horizontal plane, and determine the second included angle as the orientation of the mobile terminal. The second coordinate axis is perpendicular to the first coordinate axis.

In an example, the screen state obtaining sub-module includes:

a threshold comparison unit, configured to compare the face direction with a preset first face direction range and a preset second face direction range, and compare the orientation with a preset first orientation range and a preset second orientation range; and a state determination unit, configured to determine, in response to determining the face direction is within the first face direction range and the orientation is within the first orientation range, that the screen display state of the mobile terminal is a portrait state, and determine, in response to determining the face direction is within the second face direction range and the orientation is within the second orientation range, that the screen display state of the mobile terminal is a landscape state.

In an example, the screen state obtaining module includes:

a motion state obtaining sub-module, configured to obtain, according to the gesture data, a motion state of the mobile terminal; and a screen state obtaining sub-module, configured to determine, based on the face direction and the motion state, the screen display state of the mobile terminal.

In an example, the screen state obtaining sub-module includes:

a threshold comparison unit, configured to compare the face direction with a preset first face direction range and a preset second face direction range;

a target state determination unit, configured to determine whether the motion state is a target state; and a screen state determination unit, configured to determine, in response to determining the face direction is within the first face direction range and the motion state is the target state, that the screen display state of the mobile terminal is a portrait state, and determine, in response to determining the face direction is within the second face direction range and the motion state is the target state, that the screen display state of the mobile terminal is a landscape state.

In an example, the region size adjusting module includes:

a position determination sub-module, configured to determine, based on the screen display state, a position of the anti-false-touch region in a display screen of the mobile terminal; and a width adjusting sub-module, configured to adjust a width of the anti-false-touch region from a first width to a second width. The second width is greater than the first width.

In an example, the region size adjusting module includes:

a position determination sub-module, configured to determine, based on the screen display state, a position of the anti-false-touch region in a display screen of the mobile terminal;

a palm determination sub-module, configured to determine, according to touch data of the mobile terminal in a current use state, which palm holds the mobile terminal; and a width adjusting sub-module, configured to adjust a width of an anti-false-touch region close to the palm from a first width to a third width, and adjust a width of an anti-false-touch region away from the palm from the first width to a second width. The second width is greater than the first width and smaller than the third width.

It should be noted that the apparatus and devices shown in this example match the content of the method example, and may refer to the content of the above method example, which will not be repeated here.

Figure 12:
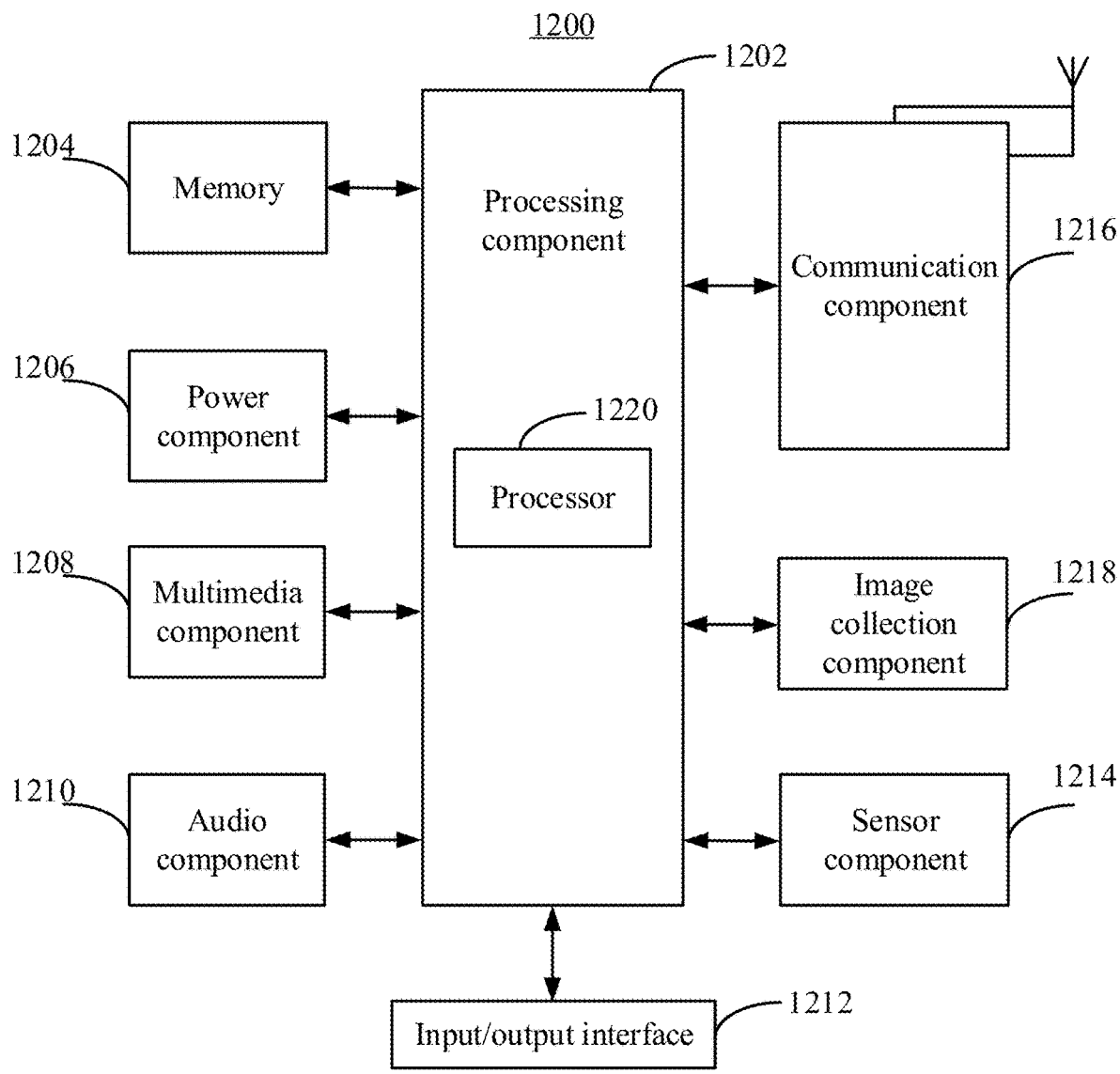
FIG. 12 is a schematic structural diagram of a mobile terminal according to an example.

FIG. 12 is a block diagram of an electronic device according to an example. For example, the electronic device 1200 may be a smart phone, a computer, a digital broadcasting terminal, a tablet device, a medical device, a fitness device, a personal digital assistant, etc.

Referring to FIG. 12, the electronic device 1200 may include one or more of the following components: a processing component 1202, a memory 1204, a power component 1206, a multimedia component 1208, an audio component 1210, an input/output (I/O) interface 1212, a sensor component 1214, a communication component 1216, and an image collection component 1218.

The processing component 1202 generally controls the overall operations of the electronic device 1200, such as operations associated with display, telephone calls, data communications, camera operations, and recording operations. The processing component 1202 may include one or more processors 1220 to execute computer programs. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operations of the electronic device 1200. Instances of such data include computer programs of any application or method operating on the electronic device 1200, contact data, phone book data, messages, pictures, videos, etc. The memory 1204 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 1206 provides power for various components of the electronic device 1200. The power component 1206 may include a power management system, one or more power supplies, and other components associated with generating, managing, and distributing the power to the electronic device 1200. The power component 1206 may include a power supply chip, and a controller may communicate with the power supply chip to control the power supply chip to turn on or off a switch device, so that a battery supplies power to a mainboard circuit or not.

The multimedia component 1208 includes a screen that provides an output interface between the electronic device 1200 and a target object. In some examples, the screen may include a liquid crystal display (LCD) and a touch panel (TP). If the screen includes the touch panel, the screen may be implemented as a touch screen to receive input information from the target object. The touch panel includes one or more touch sensors to sense touch, swiping, and gestures on the touch panel. The touch sensor may not only sense the boundary of the touch or swiping action, but also detect the duration and pressure related to the touch or swiping operation.

The audio component 1210 is configured to output and/or input audio file information. For example, the audio component 1210 includes a microphone (MIC), and when the electronic device 1200 is in an operation mode, such as a call mode, a recording mode, and a voice recognition mode, the microphone is configured to receive external audio file information. The received audio file information may be further stored in the memory 1204 or transmitted via the communication component 1216. In some examples, the audio component 1210 further includes a loudspeaker configured to output the audio file information.

The I/O interface 1212 provides an interface between the processing component 1202 and a peripheral interface module. The peripheral interface module may be a keyboard, a click wheel, buttons, and the like.

The sensor component 1214 includes one or more sensors configured to provide the electronic device 1200 with various aspects of state assessment. For example, the sensor component 1214 may detect the on/off state of the electronic device 1200, and the relative positioning of components, such as a display screen and a keypad of the electronic device 1200. The sensor component 1214 may also detect the position change of the electronic device 1200 or a component, the presence or absence of contact between the target object and the electronic device 1200, the orientation or acceleration/deceleration of the electronic device 1200, and the temperature change of the electronic device 1200. In the instance, the sensor component 1214 may include a magnetic sensor, a gyroscope and a magnetic field sensor. The magnetic field sensor includes at least one of the following: a Hall sensor, a thin film magnetoresistive sensor, or a magnetic liquid acceleration sensor.

The communication component 1216 is configured to facilitate wired or wireless communications between the electronic device 1200 and other devices. The electronic device 1200 may have an access to a wireless network based on a communication standard, such as WiFi, 2G, 3G, 4G, 5G, or a combination of them. In an example, the communication component 1216 receives a broadcast message or broadcast related messages from an external broadcast management system via a broadcast channel. In an example, the communication component 1216 further includes a near field communication (NFC) device to facilitate short-range communications. For example, the NFC device may be implemented based on a radio frequency identification (RFID) technology, an infrared data association (IrDA) technology, an ultra-wideband (UWB) technology, a Bluetooth (BT) technology and other technologies.

In an example, the electronic device 1200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components.

In an example, a computer-readable storage medium is further provided, for example, a memory 1204 including programs. The above executable computer programs may be executed by a processor. The readable storage medium may be an ROM, a random access memory (RAM), a CD-ROM, a magnetic tape, a floppy disk, an optical data storage device, etc.

Other implementation solutions of the disclosure will be apparent to those skilled in the art from consideration of the specification and practice of the disclosure disclosed here. The disclosure is intended to cover any variations, uses, or adaptations of the disclosure following the general principles of the disclosure and including common general knowledge or customary technical means in the art that are not disclosed in the disclosure. It is intended that the specification and the examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of them. It is intended that the scope of the disclosure only be limited by the appended claims.

Examples

1. An edge anti-false-touch method, applied to a mobile terminal. The method includes:

obtaining a face direction of a user of the mobile terminal, and obtaining gesture data of the mobile terminal, where the face direction includes a first included angle between a human face direction in a current image and a first coordinate axis in a coordinate system where the mobile terminal is located;

determining, according to the face direction and the gesture data, a screen display state of the mobile terminal; and adjusting, based on the screen display state, a size of an anti-false-touch region of the mobile terminal to trigger an anti-false-touch response of the anti-false-touch region.

2. The method of example 1, where the obtaining the face direction of the user of the mobile terminal, includes:

obtaining the current image of the mobile terminal in a current use state;

inputting the current image into a preset human face recognition model, and obtaining a face region of the current image output by the human face recognition model; and obtaining the first included angle between the human face direction in the face region and the first coordinate axis in the coordinate system where the mobile terminal is located, and determining the first included angle as the face direction.

3. The method of examples 1 or 2, where the determining, according to the face direction and the gesture data, the screen display state of the mobile terminal, includes:

obtaining, according to the gesture data, an orientation of the mobile terminal; and determining, based on the face direction and the orientation, the screen display state of a display screen of the mobile terminal.

4. The method of example 3, where the obtaining, according to the gesture data, the orientation of the mobile terminal, includes:

obtaining, according to the gesture data, a second included angle between a second coordinate axis in the coordinate system where the mobile terminal is located and a horizontal plane, and determining the second included angle as the orientation of the mobile terminal. The second coordinate axis is perpendicular to the first coordinate axis.

5. The method of examples 3 or 4, where the determining, according to the face direction and the orientation, the screen display state of the display screen of the mobile terminal, includes:

comparing the face direction with a preset first face direction range and a preset second face direction range, and comparing the orientation with a preset first orientation range and a preset second orientation range;

determining, in response to determining the face direction is within the first face direction range and the orientation is within the first orientation range, that the screen display state of the mobile terminal is a portrait state; and determining, in response to determining the face direction is within the second face direction range and the orientation is within the second orientation range, that the screen display state of the mobile terminal is a landscape state.

6. The method of examples 1 or 2, where the determining, according to the face direction and the gesture data, the screen display state of the mobile terminal, includes:

obtaining, according to the gesture data, a motion state of the mobile terminal; and determining, based on the face direction and the motion state, the screen display state of the mobile terminal.

7. The method of example 6, where the determining, based on the face direction and the motion state, the screen display state of the mobile terminal, includes:

comparing the face direction with a preset first face direction range and a preset second face direction range, and determining whether the motion state is a target state;

determining, in response to determining the face direction is within the first face direction range and the motion state is the target state, that the screen display state of the mobile terminal is a portrait state; and determining, in response to determining the face direction is within the second face direction range and the motion state is the target state, that the screen display state of the mobile terminal is a landscape state.

8. The method of any of examples 1 to 7, where the adjusting, based on the screen display state, the size of the anti-false-touch region of the mobile terminal to trigger the anti-false-touch response for the anti-false-touch region, includes:

determining, based on the screen display state, a position of the anti-false-touch region in a display screen of the mobile terminal; and adjusting a width of the anti-false-touch region from a first width to a second width. The second width is greater than the first width.

9. The method of any of examples 1 to 7, where the adjusting, based on the screen display state, the size of the anti-false-touch region of the mobile terminal to trigger the anti-false-touch response for the anti-false-touch region, includes:

determining, based on the screen display state, a position of the anti-false-touch region in a display screen of the mobile terminal, and determining, according to touch data of the mobile terminal in a current use state, which palm holds the mobile terminal; and adjusting a width of an anti-false-touch region close to the palm from a first width to a third width, and adjusting a width of an anti-false-touch region away from the palm from the first width to a second width. The second width is greater than the first width and smaller than the third width.

10. An edge anti-false-touch apparatus, applied to a mobile terminal. The apparatus includes:

a face direction obtaining module, configured to obtain a face direction of a user of the mobile terminal, where the face direction includes a first included angle between a human face direction in a current image and a first coordinate axis in a coordinate system where the mobile terminal is located;

a gesture data obtaining module, configured to obtain gesture data of the mobile terminal;

a screen state obtaining module, configured to determine, according to the face direction and the gesture data, a screen display state of the mobile terminal; and a region size adjusting module, configured to adjust, based on the screen display state, a size of an anti-false-touch region of the mobile terminal to trigger an anti-false-touch response for the anti-false-touch region.

11. The apparatus of example 10, where the face direction obtaining module includes:

a current image obtaining sub-module, configured to obtain the current image of the mobile terminal in a current use state;

a region obtaining sub-module, configured to input the current image into a preset human face recognition model, and obtain a face region of the current image output by the human face recognition model; and a first included angle obtaining sub-module, configured to obtain the first included angle between the human face direction in the face region and the first coordinate axis in the coordinate system where the mobile terminal is located, and determine the first included angle as the face direction.

12. The apparatus of examples 10 or 11, where the screen state obtaining module includes:

a terminal orientation obtaining sub-module, configured to obtain, according to the gesture data, an orientation of the mobile terminal; and a screen state obtaining sub-module, configured to determine, based on the face direction and the orientation, the screen display state of a display screen of the mobile terminal.

13. The apparatus of example 12, where the terminal orientation obtaining sub-module includes:

a second included angle obtaining sub-module, configured to obtain, according to the gesture data, a second included angle between a second coordinate axis in the coordinate system where the mobile terminal is located and a horizontal plane, and determine the second included angle as the orientation of the mobile terminal. The second coordinate axis is perpendicular to the first coordinate axis.

14. The apparatus of examples 12 or 13, where the screen state obtaining sub-module includes:

a threshold comparison unit, configured to compare the face direction with a preset first face direction range and a preset second face direction range, and compare the orientation with a preset first orientation range and a preset second orientation range; and a state determination unit, configured to determine, in response to determining the face direction is within the first face direction range and the orientation is within the first orientation range, that the screen display state of the mobile terminal is a portrait state, and determine, in response to determining the face direction is within the second face direction range and the orientation is within the second orientation range, that the screen display state of the mobile terminal is a landscape state.

15. The apparatus of examples 10 or 11, where the screen state obtaining module includes:

a motion state obtaining sub-module, configured to obtain, according to the gesture data, a motion state of the mobile terminal; and a screen state obtaining sub-module, configured to determine, based on the face direction and the motion state, the screen display state of the mobile terminal.

16. The apparatus of example 15, where the screen state obtaining sub-module includes:

a threshold comparison unit, configured to compare the face direction with a preset first face direction range and a preset second face direction range;

a target state determination unit, configured to determine whether the motion state is a target state; and a screen state determination unit, configured to determine, in response to determining the face direction is within the first face direction range and the motion state is the target state, that the screen display state of the mobile terminal is a portrait state, and determine, in response to determining the face direction is within the second face direction range and the motion state is the target state, that the screen display state of the mobile terminal is a landscape state.

17. The apparatus of any of examples 10 to 16, where the region size adjusting module includes:

a position determination sub-module, configured to determine, based on the screen display state, a position of the anti-false-touch region in a display screen of the mobile terminal; and a width adjusting sub-module, configured to adjust a width of the anti-false-touch region from a first width to a second width. The second width is greater than the first width.

18. The apparatus of any of examples 10 to 16, where the region size adjusting module includes:

a position determination sub-module, configured to determine, based on the screen display state, a position of the anti-false-touch region in a display screen of the mobile terminal;

a palm determination sub-module, configured to determine, according to touch data of the mobile terminal in a current use state, which palm holds the mobile terminal; and a width adjusting sub-module, configured to adjust a width of an anti-false-touch region close to the palm from a first width to a third width, and adjust a width of an anti-false-touch region away from the palm from the first width to a second width. The second width is greater than the first width and smaller than the third width.

19. An electronic device, including:

a processor; and a memory configured to store processor-executable programs, where the processor is configured to implement the method according to any one of examples 1 to 9.

20. A non-transitory computer-readable storage medium on which a computer program is stored, when the program is executed by a processor, the steps of the method according to any one of examples 1 to 9 are implemented.

What is claimed is:

1. An edge anti-false-touch method, comprising:

obtaining, by a mobile terminal, a face direction of a user of the mobile terminal, and obtaining gesture data of the mobile terminal, wherein the face direction comprises a first included angle between a human face direction in a current image and a first coordinate axis in a coordinate system where the mobile terminal is located;

determining, by the mobile terminal according to the face direction and the gesture data, a screen display state of the mobile terminal; and adjusting, by the mobile terminal based on the screen display state, a size of an anti-false-touch region of the mobile terminal to trigger an anti-false-touch response of the anti-false-touch region.

2. The method according to claim 1, wherein obtaining the face direction of the user of the mobile terminal, comprises:

obtaining the current image of the mobile terminal in a current use state;

inputting the current image into a preset human face recognition model, and obtaining a face region of the current image output by the human face recognition model; and obtaining the first included angle between the human face direction in the face region and the first coordinate axis in the coordinate system where the mobile terminal is located, and determining the first included angle as the face direction.

3. The method according to claim 1, wherein determining the screen display state of the mobile terminal according to the face direction and the gesture data, comprises:

obtaining, according to the gesture data, an orientation of the mobile terminal; and determining, based on the face direction and the orientation, the screen display state of a display screen of the mobile terminal.

4. The method according to claim 3, wherein obtaining, according to the gesture data, the orientation of the mobile terminal, comprises:

obtaining, according to the gesture data, a second included angle between a second coordinate axis in the coordinate system where the mobile terminal is located and a horizontal plane, and determining the second included angle as the orientation of the mobile terminal, wherein the second coordinate axis is perpendicular to the first coordinate axis.

5. The method according to claim 3, wherein determining, according to the face direction and the orientation, the screen display state of the display screen of the mobile terminal, comprises:

comparing the face direction with a preset first face direction range and a preset second face direction range, and comparing the orientation with a preset first orientation range and a preset second orientation range;

determining, in response to determining that the face direction is within the first face direction range and the orientation is within the first orientation range, that the screen display state of the mobile terminal is a portrait state; and determining, in response to determining that the face direction is within the second face direction range and the orientation is within the second orientation range, that the screen display state of the mobile terminal is a landscape state.

6. The method according to claim 1, wherein determining, according to the face direction and the gesture data, the screen display state of the mobile terminal, comprises:

obtaining, according to the gesture data, a motion state of the mobile terminal; and determining, based on the face direction and the motion state, the screen display state of the mobile terminal.

7. The method according to claim 6, wherein determining, based on the face direction and the motion state, the screen display state of the mobile terminal, comprises:

comparing the face direction with a preset first face direction range and a preset second face direction range, and determining whether the motion state is a target state;

determining, in response to determining that the face direction is within the first face direction range and the motion state is the target state, that the screen display state of the mobile terminal is a portrait state; and determining, in response to determining that the face direction is within the second face direction range and the motion state is the target state, that the screen display state of the mobile terminal is a landscape state.

8. The method according to claim 1, wherein adjusting, based on the screen display state, the size of the anti-false-touch region of the mobile terminal to trigger the anti-false-touch response for the anti-false-touch region, comprises:

determining, based on the screen display state, a position of the anti-false-touch region in a display screen of the mobile terminal; and adjusting a width of the anti-false-touch region from a first width to a second width, wherein the second width is greater than the first width.

9. The method according to claim 1, wherein adjusting, based on the screen display state, the size of the anti-false-touch region of the mobile terminal to trigger the anti-false-touch response for the anti-false-touch region, comprises:

determining, based on the screen display state, a position of the anti-false-touch region in a display screen of the mobile terminal, and determining, according to touch data of the mobile terminal in a current use state, which palm holds the mobile terminal; and adjusting a width of an anti-false-touch region close to the palm from a first width to a third width, and adjusting a width of an anti-false-touch region away from the palm from the first width to a second width, wherein the second width is greater than the first width and smaller than the third width.

10. An electronic device, comprising:

a processor; and a memory configured to store processor-executable programs, wherein the processor is configured to:

obtain a face direction of a user of the mobile terminal, and obtaining gesture data of the mobile terminal, wherein the face direction comprises a first included angle between a human face direction in a current image and a first coordinate axis in a coordinate system where the mobile terminal is located;

determine, according to the face direction and the gesture data, a screen display state of the mobile terminal; and adjust, based on the screen display state, a size of an anti-false-touch region of the mobile terminal to trigger an anti-false-touch response of the anti-false-touch region.

11. The electronic device according to claim 10, wherein the processor is configured to:

obtain the current image of the mobile terminal in a current use state;

input the current image into a preset human face recognition model, and obtaining a face region of the current image output by the human face recognition model; and obtain the first included angle between the human face direction in the face region and the first coordinate axis in the coordinate system where the mobile terminal is located, and determining the first included angle as the face direction.

12. The electronic device according to claim 10, wherein the processor is configured to:

obtain, according to the gesture data, an orientation of the mobile terminal; and determine, based on the face direction and the orientation, the screen display state of a display screen of the mobile terminal.

13. The electronic device according to claim 12, wherein the processor is configured to:

obtain, according to the gesture data, a second included angle between a second coordinate axis in the coordinate system where the mobile terminal is located and a horizontal plane, and determining the second included angle as the orientation of the mobile terminal, wherein the second coordinate axis is perpendicular to the first coordinate axis.

14. The electronic device according to claim 12, wherein the processor is configured to:

compare the face direction with a preset first face direction range and a preset second face direction range, and comparing the orientation with a preset first orientation range and a preset second orientation range;

determine, in response to determining that the face direction is within the first face direction range and the orientation is within the first orientation range, that the screen display state of the mobile terminal is a portrait state; and determine, in response to determining that the face direction is within the second face direction range and the orientation is within the second orientation range, that the screen display state of the mobile terminal is a landscape state.

15. The electronic device according to claim 10, wherein the processor is configured to:

obtain, according to the gesture data, a motion state of the mobile terminal; and determine, based on the face direction and the motion state, the screen display state of the mobile terminal.

16. The electronic device according to claim 15, wherein the processor is configured to:

compare the face direction with a preset first face direction range and a preset second face direction range, and determining whether the motion state is a target state;

determine, in response to determining that the face direction is within the first face direction range and the motion state is the target state, that the screen display state of the mobile terminal is a portrait state; and determine, in response to determining that the face direction is within the second face direction range and the motion state is the target state, that the screen display state of the mobile terminal is a landscape state.

17. The electronic device according to claim 10, wherein the processor is configured to:

determine, based on the screen display state, a position of the anti-false-touch region in a display screen of the mobile terminal; and adjust a width of the anti-false-touch region from a first width to a second width, wherein the second width is greater than the first width.

18. The electronic device according to claim 10, wherein the processor is configured to:

determine, based on the screen display state, a position of the anti-false-touch region in a display screen of the mobile terminal, and determining, according to touch data of the mobile terminal in a current use state, which palm holds the mobile terminal; and adjust a width of an anti-false-touch region close to the palm from a first width to a third width, and adjusting a width of an anti-false-touch region away from the palm from the first width to a second width, wherein the second width is greater than the first width and smaller than the third width.

19. A non-transitory computer-readable storage medium on which a computer program is stored, wherein when the program is executed by a processor, the processor is caused to:
- obtain a face direction of a user of the mobile terminal, and obtaining gesture data of the mobile terminal, wherein the face direction comprises a first included angle between a human face direction in a current image and a first coordinate axis in a coordinate system where the mobile terminal is located;
- determine, according to the face direction and the gesture data, a screen display state of the mobile terminal; and
- adjust, based on the screen display state, a size of an anti-false-touch region of the mobile terminal to trigger an anti-false-touch response of the anti-false-touch region.

20. The non-transitory computer readable storage medium according to claim 19, wherein the processor is caused to:
- obtain the current image of the mobile terminal in a current use state;
- input the current image into a preset human face recognition model, and obtaining a face region of the current image output by the human face recognition model; and
- obtain the first included angle between the human face direction in the face region and the first coordinate axis in the coordinate system where the mobile terminal is located, and determining the first included angle as the face direction.

* * * * *